(No Model.)

F. J. HEILBORN.
BICYCLE ALARM.

No. 597,829. Patented Jan. 25, 1898.

Witnesses. Inventor.
Franz J. Heilborn.
by Geo. H. Remington & Co.
Att'ys.

UNITED STATES PATENT OFFICE.

FRANZ J. HEILBORN, OF PLAINVILLE, MASSACHUSETTS.

BICYCLE-ALARM.

SPECIFICATION forming part of Letters Patent No. 597,829, dated January 25, 1898.

Application filed May 5, 1897. Serial No. 635,185. (No model.)

*To all whom it may concern:*

Be it known that I, FRANZ J. HEILBORN, a subject of the Queen of Great Britain, residing at Plainville, in the county of Norfolk and State of Massachusetts, have invented certain new and useful Improvements in Bicycle-Alarms; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to devices adapted to be secured to bicycles or other analogous vehicles for the purpose of making alarms; and it consists, essentially, of a spring-resisted swinging arm or lever adjustably mounted in a holder jointed to a coupling or yoke adapted to be clamped to the frame of a bicycle and having the lower or free end of the lever provided with a freely-turning combined friction and toothed wheel, the latter having a spring tongue or clapper in continuous engagement therewith, all as more fully hereinafter set forth and claimed.

My improved bicycle-alarm is of the class adapted to be made operative by contact with the tire of the revolving wheel of the bicycle—that is to say, in some types of bicycle-bells the construction, arrangement, and location of the parts are such that in order to ring the bell, as in sounding an alarm, the rider simply pulls a conveniently-located cord, thereby bringing certain parts of the mechanism into frictional engagement with the tire of the revolving wheel, which in turn actuates the bell itself, thus making an alarm, the sound thus produced being continuously maintained until the tension upon the cord is released by the rider. In some respects the sound produced by my improved bicycle-alarm resembles that of the well-known watchman's rattle.

Figure 1:
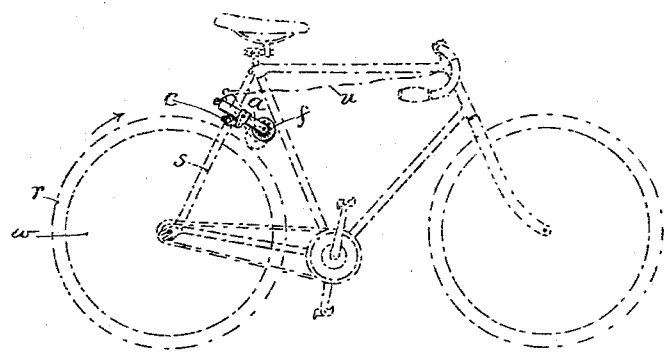
Figures 3, 5:
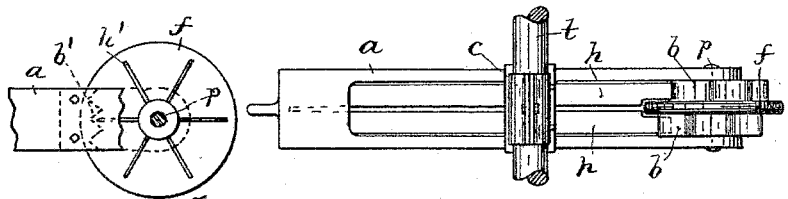
Figures 2, 4:
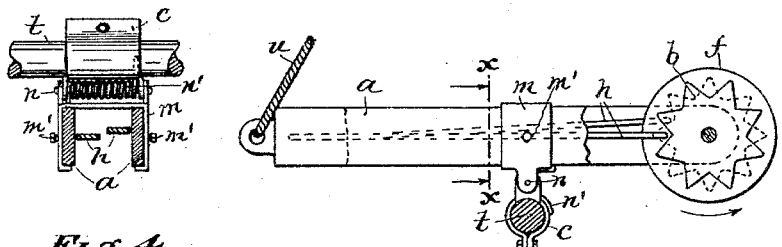

In the accompanying sheet of drawings, Figure 1 is a side elevation, in reduced scale, showing my invention attached to a bicycle, the latter shown in dotted lines. Fig. 2 is a side elevation of the device, in enlarged scale, a portion of the lever being broken away. Fig. 3 is a top plan view. Fig. 4 is a vertical section taken on line $x\ x$ of Fig. 2, and Fig. 5 shows a modification.

I prefer to provide my improved alarm device with a coupling or yoke $c$, adapted to be removably secured to the short horizontal tie member $l$, uniting the two vertically-arranged side members $s$, forming the rear fork of the bicycle-frame. Between these members $s$ is located the rear traction-wheel $w$, the latter having any suitable resilient tire $r$, as usual.

$a$ indicates a swinging forked arm or lever carrying at its lower end the coarse toothed or "click" wheel $b$ and the friction-wheel $f$. I prefer to employ two laterally-separated wheels $b$ having the friction-wheel $f$ interposed between them, substantially as represented in the drawings. The three wheels $b\ f$ are secured together, thus adapting them to revolve in unison on the fixed pin or axle $p$, mounted in the bottom end of the forked part of the lever. The teeth of the wheels $b$ may be V-shaped, the relation of the wheels to each other being such that the teeth of one wheel lie opposite the spaces between the teeth of the other one. I would state, too, that the diameter of the center or friction wheel $f$ exceeds that of the toothed wheels, thus preventing the latter from engaging with the surface of the wheel-tire $r$ at all times.

To the upper part of the wheel-carrying lever or arm $a$ are secured a pair of suitable spring clappers or tongues $h$, one for each wheel $b$, the lower ends of these tongues being in constant frictional engagement with the teeth of said wheels, substantially as shown.

In order to adapt my improved bicycle-alarm to various kinds and sizes of frames, the lever $a$ may be slidably mounted in a guide holder or bracket $m$, adjusting-screws $m'$ maintaining the lever in any desired position vertically. The rear side of the holder is provided with ears through which passes a joint-pin $n$, the latter also passing through ears formed on the said coupling or yoke member $c$, thus hinging the two members $m\ c$ together. The said hinge or pivot may have a spring $n'$ combined therewith, having a force capable of automatically keeping the lever, &c., in the normal or non-contact position, as shown in Figs. 1 and 4.

To the upper end of the lever $a$ is attached a cord $u$ or other suitable connection, the same being guided toward the front of the bicycle and so located that the rider can manipulate it readily and quickly when desired.

In using my improved bicycle-alarm, forming the subject of the present application for patent, the rider upon pulling the cord $u$ causes the lever $a$ to swing rearwardly from the normal position (shown in Fig. 1) until its friction-wheel $f$ is in yielding contact with the surface of the tire of the revolving rear wheel $w$, (see also dotted-line position, Fig. 1,) the resulting action being to rotate the several small wheels $b\ f$ at a corresponding rate of speed, thus causing the teeth of the wheels $b$ to revolve successively past the ends of the respective spring-tongues $h$, the latter yielding for the purpose. At the same time the resiliency of the tongue springs it smartly from tooth to tooth, thus producing a practically continuous, yet slightly intermittent, startling sound, somewhat analogous to that emitted by a watchman's rattle.

The lever, wheels, and tongues employed in my improved bicycle-alarm may be made of wood, although other suitable material may be used.

I may add that without departing from the spirit of my invention I may employ a greater number of the toothed wheels $b$ and a corresponding number of the tongues $h$, or the arrangement of the parts may be such that a wheel having a series of short spring-tongues $h'$ revolves past a fixed member $b'$, having notches therein, substantially as shown in Fig. 5. If desired, the friction-wheel $f$ may be omitted, thereby permitting the teeth of the wheels $b$ to impinge against the tire and thus revolve them.

I claim as my invention—

In a bicycle-alarm, the combination with the arm $a$ having friction and toothed wheels, $f$, $b$, mounted to revolve therein, of the holder and attaching members, $m$, $c$, hinged together, the said arm $a$ being slidably mounted in the holder, and means for retaining the arm in position therein after adjustment, substantially as set forth.

In testimony whereof I have affixed my signature in presence of two witnesses.

FRANZ J. HEILBORN.

Witnesses:
 GEO. H. REMINGTON,
 REMINGTON SHERMAN.